US012387522B2

(12) United States Patent
Goodwin et al.

(10) Patent No.: US 12,387,522 B2
(45) Date of Patent: Aug. 12, 2025

(54) APPARATUS AND METHOD OF MOSQUITO IDENTIFICATION

(71) Applicant: Vectech, Baltimore, MD (US)

(72) Inventors: Adam Goodwin, Baltimore, MD (US); Sanket Padmanabhan, San Diego, CA (US); Kiley Gersch, Sherwood, OR (US)

(73) Assignee: Vectech, Baltimore, MD (US)

( * ) Notice: Subject to any disclaimer, the term of this patent is extended or adjusted under 35 U.S.C. 154(b) by 247 days.

(21) Appl. No.: 17/486,834

(22) Filed: Sep. 27, 2021

(65) Prior Publication Data

US 2022/0101015 A1 Mar. 31, 2022

Related U.S. Application Data

(60) Provisional application No. 63/084,476, filed on Sep. 28, 2020.

(51) Int. Cl.
*G06V 40/10* (2022.01)
*A01M 1/02* (2006.01)
*H04N 23/51* (2023.01)

(52) U.S. Cl.
CPC ........... *G06V 40/103* (2022.01); *H04N 23/51* (2023.01); *A01M 1/026* (2013.01)

(58) Field of Classification Search
CPC ............. H04W 52/0235; H04W 72/23; H04W 52/0212; G02B 21/365; G02B 21/34; H04N 5/2256
See application file for complete search history.

(56) References Cited

U.S. PATENT DOCUMENTS

| | | | | |
|---|---|---|---|---|
| 2008/0306964 | A1* | 12/2008 | Molnar | G16H 30/20 382/128 |
| 2009/0087074 | A1* | 4/2009 | Wong | G06K 9/00 382/133 |
| 2009/0290238 | A1* | 11/2009 | Lee | H04N 23/55 359/802 |
| 2013/0294826 | A1* | 11/2013 | Chen | F16B 5/0635 403/373 |
| 2013/0342655 | A1* | 12/2013 | Gutierrez | H04N 13/0203 348/46 |

(Continued)

*Primary Examiner* — Xi Wang
(74) *Attorney, Agent, or Firm* — Syam Anand

(57) ABSTRACT

An apparatus and system for generating digital images of specimens and identifying the species of an invertebrate, such as a mosquito, are disclosed. The apparatus includes an imaging device capable of capturing images, light sources to illuminate the optical field of view of the imaging device, a housing enclosing the imaging device and the light source, and an opening in the housing where a specimen tray can be inserted. The specimen tray can include a lid and multiple wells separated by transparent walls, each well capable of holding a specimen. The wells are fully enclosed when the lid is placed on the tray and the tray includes markings on both sides indicating the tray orientation, as the tray is transparent on the lid and base of the tray to enable imaging from two sides of the tray. The housing and tray also includes detents and indents for locking the tray into the correct placement when inserted into the slot. The imaging device is capable of capturing high quality images of two distinct viewpoints of all specimens in the wells.

24 Claims, 16 Drawing Sheets

(56) References Cited

U.S. PATENT DOCUMENTS

2016/0139387 A1* 5/2016 Virk .................. G02B 21/002
                                                        348/79
2017/0068086 A1* 3/2017 Tomer ............... G02B 21/0076
2018/0224592 A1* 8/2018 Holdsworth ........... G06T 7/001

* cited by examiner

APPARATUS AND METHOD OF MOSQUITO IDENTIFICATION

The applicant claims the benefit of the priority date of provisional application 63/084,476 filed on Sep. 28, 2020.

FIELD OF THE INVENTION

The present invention relates generally to the field of automated computer vision recognition, more specifically, to a rapid and standardized method and apparatus for imaging small invertebrates, such as arthropods or mosquitoes, for the purposes of computer vision based identification of species.

BACKGROUND OF THE INVENTION

Disease-carrying invertebrates, such as mosquitoes, are the deadliest animal in the world, infecting over 350 million people each year with a range of diseases. Driven by climate change expanding habitats for disease carrying species and mosquitoes' ability to rapidly evolve insecticide resistance in response to control measures, this burden is expected to grow. The best way to prevent the spread of mosquito borne disease is integrated vector control of disease-carrying mosquitoes. Vector surveillance—monitoring an area to understand mosquito species composition, abundance, and spatial distribution—is critical to informing decisions about which control strategies will be most effective in specific locations and is necessary to determine the efficacy of intervention in decreasing high risk mosquito populations. Effective vector surveillance requires the capture and accurate identification of hundreds to thousands of mosquitoes from multiple locations in a region. Any region may have from 25-100 species of mosquitoes, and there are over 3000 species of mosquitoes globally.

Existing methods for the identification of mosquitoes are various. Visual inspection of mosquito species by a trained expert is the most common method of identification. However, visual identification is both time consuming and error prone. It requires a trained expert to be continuously present in the target region and is subject to a significant error rate due to variation in human training, experience, and the fine-grained morphological differences between several mosquito species. Another method, molecular identification through DNA analysis using DNA barcoding, is a more accurate method for determining species. However, it has a high cost per specimen and must be performed in a lab by trained technicians.

These gaps in mosquito species identification have led to recent applications of computer vision methods for mosquito species identification. Computer vision (CV) is a field of study that works on enabling a computer algorithm to identify an image based on datasets of existing images. Its capabilities have expanded dramatically in the past few years, enabling very high accuracy for complex classification problems through the use of parallel computing and massive labelled image datasets.

Computer vision-based approaches for mosquito identification have potential for high classification accuracy, but use has been restricted due to the lack of massive image datasets and challenging technical approaches required to develop fine grain data driven learning algorithms. Approaches include a system for remote image capture of specimens captured in mosquito traps where a baseline resolution of 16 line pairs per millimeter was defined as a resolution requirement for differentiation between *Aedes albopictus* and *Aedes aegypti* mosquitoes (Goodwin A, Glancey M, Ford T, et al. Development of a low-cost imaging system for remote mosquito surveillance. *Biomed Opt Express*. 2020; 11(5):2560-2569) and research applying computer vision to mosquito species identification achieving high accuracy with custom built datasets (Jannelle Couret, Danilo C Moreira, Davin Bernier et al. Delimiting cryptic morphological variation among human malaria vector species using convolutional neural networks, 19 Mar. 2020, PREPRINT (Version 1) available at Research Square [https://doi.org/10.21203/rs.3.rs-17939/v1]). No reliable computer vision method for species identification of mosquitoes has yet been commercialized, though the technology is ready for such translation. Thus, there exists a need for a quick and reliable imaging method to facilitate the identification of disease-carrying invertebrates, e.g., mosquitoes, which can be implemented in a commercial fashion via a technologically sound computer vision system functioning off of a vast and comprehensive image database.

SUMMARY OF THE INVENTION

The present invention is for an apparatus and system for generating digital images of a specimen and identifying the species of an invertebrate, for example, an arthropod or an arachnid, are disclosed. The apparatus includes an imaging device capable of capturing images, light sources to illuminate the optical field of view of the imaging device, a housing enclosing the imaging device and internal light source while limiting or eliminating external environmental light, and an opening in the housing where a specimen tray can be inserted. The specimen tray may include multiple wells separated by transparent walls, each well capable of holding and isolating a specimen. When present in a particular embodiment, the wells are fully enclosed. The tray optionally includes markings on both sides indicating its orientation. The housing and tray also includes detents and indents for locking the tray into place when inserted into the slot. An alternative embodiment uses magnets on the housing and matching magnets on the tray to provide a user haptic feedback when the tray is locked into place when inserted into the slot. In a further embodiment, the locking mechanism is placed in successive positions along the tray axis, corresponding to subsequent defined optical fields of view. As the tray is inserted into the device, the tray will lock at defined positions until moved to the subsequent locking position. In this case, the housing may include an exit slot in addition to an entrance slot to accommodate trays longer than the length of the housing.

An exemplary embodiment of the apparatus can be further configured to allow the tray to be inserted either right-side up or upside down, and the markings on each side of the tray indicate which side is facing the imaging system. This enables imaging of both sides of the tray, and for both of these distinct views of the specimens in the tray to be input into an identification algorithm. The apparatus can be configured to capture images of the tray both right-side up and up-side down, and use the markings on the tray to correlate images of both sides of the tray to determine the relative position of each well. An alternative embodiment of the tray does not use wells to separate specimens, but instead specimens are loose in an open tray without separation. The apparatus will then include algorithmic digital separation of the specimens prior to identification of individual specimens. This alternative embodiment enables a user to prioritize speed of identification of large numbers of specimens, rather than accuracy and correlation of individual specimen identification to subsequent testing of the specimens. This embodiment may include a longer tray with multiple subsequent fields of view to capture the entire length of the tray, enabling many more specimens to be imaged per tray. This open tray may slide into and through the apparatus similar to the aforementioned tray, or may be set on a track, similar to a drawer mechanism to facilitate stable and smooth insertion. The display to the user would then indicate location and identification of specimens.

In a further embodiment, the tray can be designed to have two groups of wells, a first group on the upper end and the second group on the lower end of the tray. The tray can then be inserted into the housing in four different fixed positions—the first group of wells right side up, the first group of wells up-side down, the second group of wells right-side up, and the second group of wells up-side down. The markings on both sides of the tray can indicate which of the four positions is facing the imaging system. The markings on the tray can be further used to correlate images of each of the four positions to determine the relative position of each well. In one embodiment, each separate orientation includes 12 wells.

In another embodiment, the light source in the housing can further cause each of the specimens to emit a specific wavelength of light, which allows for the classification of the specimen. The light source can further include a top light source for reflective light imaging positioned above the tray and a side light source placed on the side of the tray. The top light source can be set to be more intense than the side light source. In an exemplary embodiment, the top light source can be two LED light strips positioned parallel to each other. Alternative embodiments include a light source placed underneath the tray to provide transmission lighting. In one embodiment, the background underneath the tray is white. In an alternative embodiment, specimens of interest may be marked with visual color, fluorescent material, or genetic modifications to produce fluorescence. For instance, transgenic specimens having been genetically modified and released into the wild, then captured in surveillance practices to monitor the population levels of the transgenic specimens in comparison to the wild type. These transgenic specimens may also have been modified to fluoresce under specific wavelengths of light, which may require an alternative embodiment with an alternative wavelength of light for excitation, and an alternative image sensor whose pixels capture the fluorescent light by sensor design or attachment of an appropriate lens for filtering out other wavelengths of light outside the band of the emitted light. In this alternative embodiment, the light source for excitation and the alternative imager may activate simultaneously or asynchronously with the visible light spectrum components of the system. In a separate alternative embodiment, there may be a backlight source for transmissive light imaging in combination with reflective light imaging.

For the side lighting, the side light source can be one or more, e.g., three or four, LEDs positioned to surround the tray on one or more sides, for example, three of four, except for the side where the tray is inserted. Each side light source can contain light diffusers in between the LEDs and the specimens.

A color calibration unit may be included to maintain consistency of color information in the images between devices regardless of temperature, humidity, external lighting environment of the workspace, degradation or alteration of critical components of the apparatus due to persistent use, and other factors which could impact the function of the sensor regarding intensity of response of different color pixels. This color calibration unit will consist of multiple distinct colors in the field of view of the imager, and may be included on the base of the device behind the intended location of the transparent tray such that each image includes the color calibration unit for persistent validation. The distinct known colors of the unit will be used in preprocessing the image to normalize the color of the image, such that the color calibration unit colors are the same across every image captured by the system.

The tray can be further designed so that the tray lid and tray base are raised relative to the transparent top and bottom coverings so that the user can handle the tray without touching the transparent top and bottom coverings. The raised tray lid, raised tray base, and the tray well walls can be held together by screws, magnets, flexure designed snap fits, or a combination thereof. The tray can be further designed such that the specimen remains in the same relative orientation when the tray is flipped upside down.

The apparatus may also include a circuit board connected to the imaging device and light sources, and an indicator panel connected to the imaging device. The circuit board may also include a processor that can read and analyze the markings on the images on the trays to determine the orientation of the tray and communicate with the indicator panel to cause it to display whether image data has been captured for each orientation. The apparatus may also be connected to a server via the internet, where the server includes a processor and memory that can analyze the images to determine characteristics of the specimen, including the species, sex, life stage, age, physical condition, or the population origins of the specimen. This processing may also be done on the apparatus processor, rather than on a server.

BRIEF DESCRIPTION OF THE DRAWINGS

Exemplary embodiments of the present invention are shown in the drawing and are explained in detail in the following description. The figures show.

DETAILED DESCRIPTION OF THE INVENTION

Figure 1:
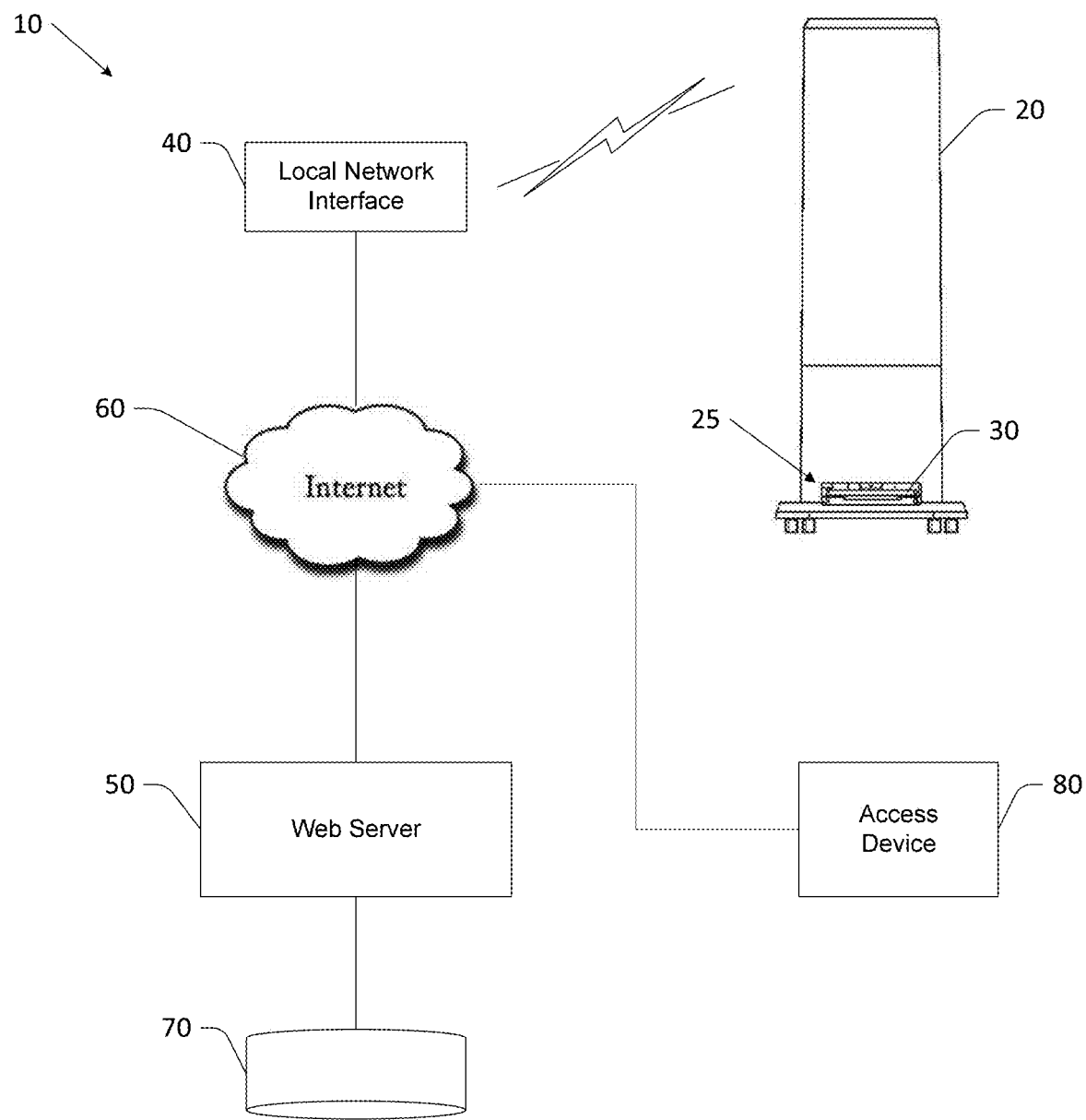
FIG. 1 is a schematic diagram of the system for identifying the species of an invertebrate according to one embodiment of the present invention, including an apparatus for generating digital images of more than one specimen connected to a web server for identifying characteristics of invertebrates based on computer vision algorithms.

FIG. 1 is a schematic diagram of a system for identifying the species of an arthropod 10 according to one embodiment of the present invention, including: an apparatus for generating digital images of more than one specimen 20 having an opening that forms a slot 25 for receiving a tray assembly 30 that holds sample insects; a local network interface 40 configured to communicate with the apparatus for generating digital images 20; a web server 50 for communicating with the apparatus for generating digital images 20 via the Internet 60; an insect image database 70 coupled to the web server 50; and an access device 80 coupled to the web server 50 and apparatus for generating digital images 20 via the Internet.

In one embodiment of the present invention, the apparatus for generating digital images 20 is adapted to generate digital images of mosquitos or other types of arthropods placed in the tray assembly 30, which slides into the slot 25. As explained herein, the apparatus for generating digital images 20 includes a digital imaging device for generating the digital images, and a circuit board for transmitting the digital images to the web server 60 via the Internet. In varying embodiments, the local interface 40 may be an Ethernet connection, a Wi-Fi router, a Bluetooth connection, a cell network connection, or any other type of local network interface.

The web server 50 is configured to evaluate the digital images by performing deep convolutional neural network algorithms based on images data stored in the insect image database 70. In this manner, the insect identification system 10 processes the images of the mosquitoes for identification of characteristics including: species, sex, life stage, age, physical condition, and whether the mosquito originates from a specific population. In alternate embodiments, the apparatus is configured to allow for processing of the images directly in the device.

Figure 2A:
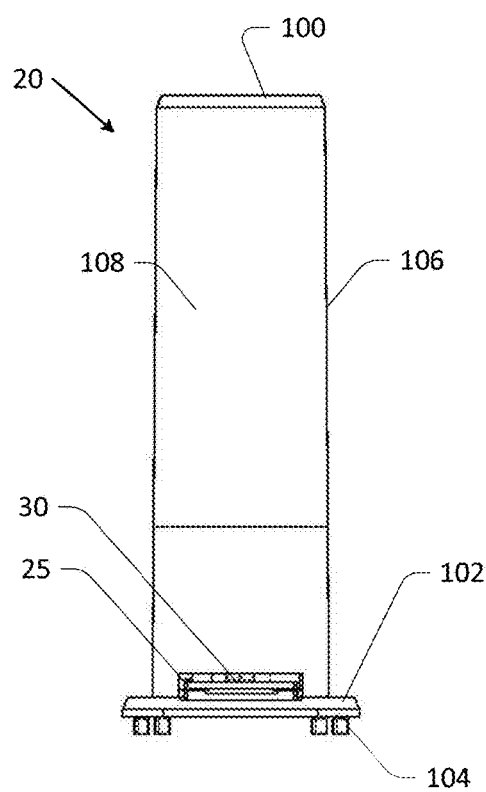
FIGS. 2A-2D show front, back and side orthogonal views of the exterior of one embodiment of an apparatus for generating digital images of more than one specimen in accordance with the present invention, including a housing with an opening that forms a slot for receiving a tray assembly configured to hold sample invertebrates.

FIG. 2A shows a front orthogonal view of the exterior of the apparatus for generating digital images of more than one specimen 20 in accordance with one embodiment of the present invention. The apparatus 20 includes a housing 100 sitting on a base 102 supported by legs 104. The housing 100 includes an outer shell 106, which may be formed of plastic or metal or any other material. The slot 25 for receiving the tray assembly 30 is formed in a portion of a removable front cover 108 of the housing 100 proximate the base 102. In particular embodiments, the resolution of the optical system is about 16 line pairs per millimeter lp/mm, about 28 lp/mm, or about 32 lp/mm. In particular embodiments, the resolution of the optical system is 16 lp/mm, 28 lp/mm, or 32 lp/mm. In particular embodiments, the resolution of the optical system is between about 16 lp/mm and about 28 lp/mm, or between about 16 lp/mm and about 32 lp/mm. In particular embodiments, the resolution of the optical system is between about 28 lp/mm and about 32 lp/mm.

Figure 2B:
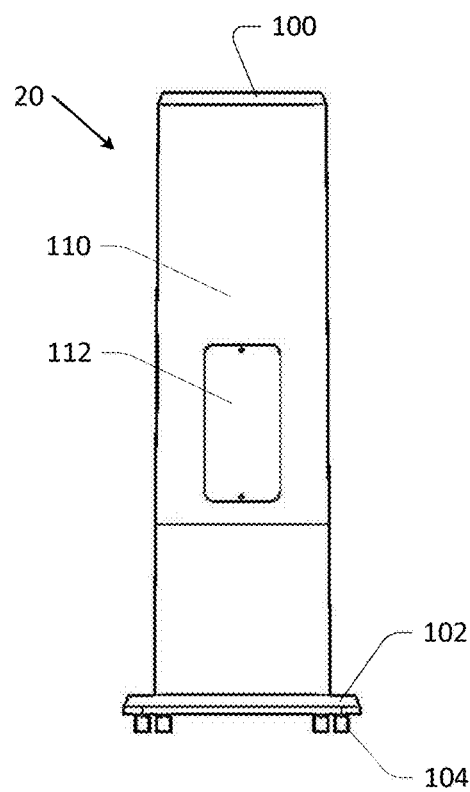
Figure 2C:
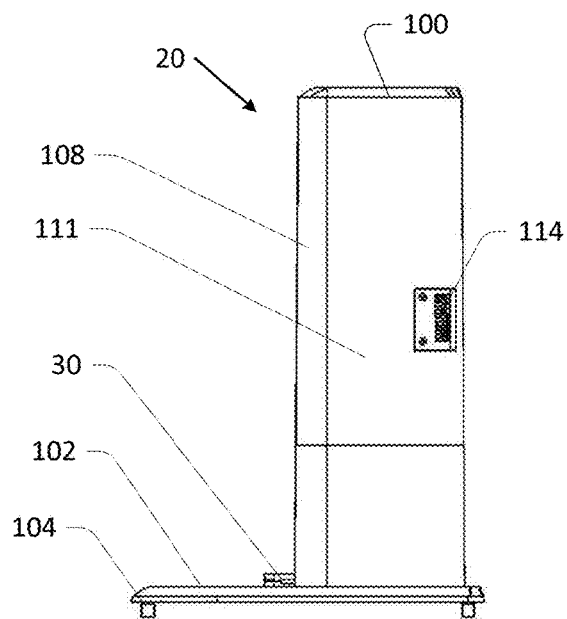
Figure 2D:
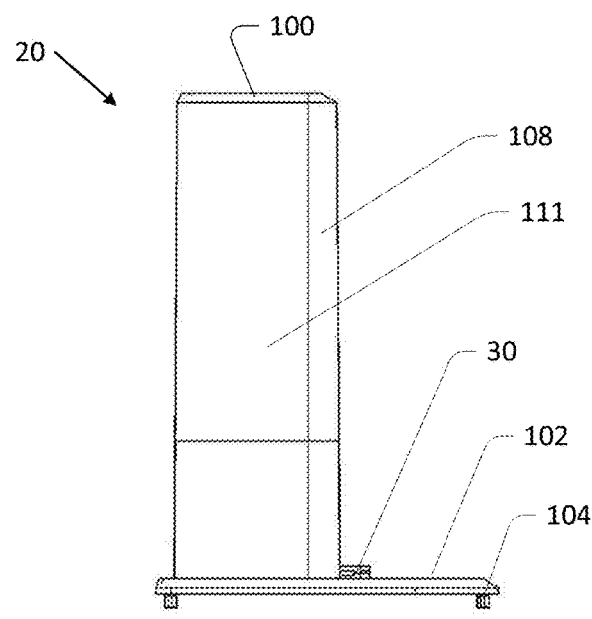

As shown in the rear orthogonal view FIG. 2B, the outer shell of the housing also includes a back cover 110 with a rear access panel 112. FIGS. 2C and 2D show orthogonal side views of the apparatus 20 revealing side covers 111 and a side access panel 114 providing further access to components inside of the housing. In alternative embodiments, the slot 25 for receiving the tray assembly is duplicated on the back cover 110 to enable a specimen tray 30 of length greater than the housing 111 width and allowing the tray 30 to be pushed through the housing 111 in a single direction.

Figure 2E:
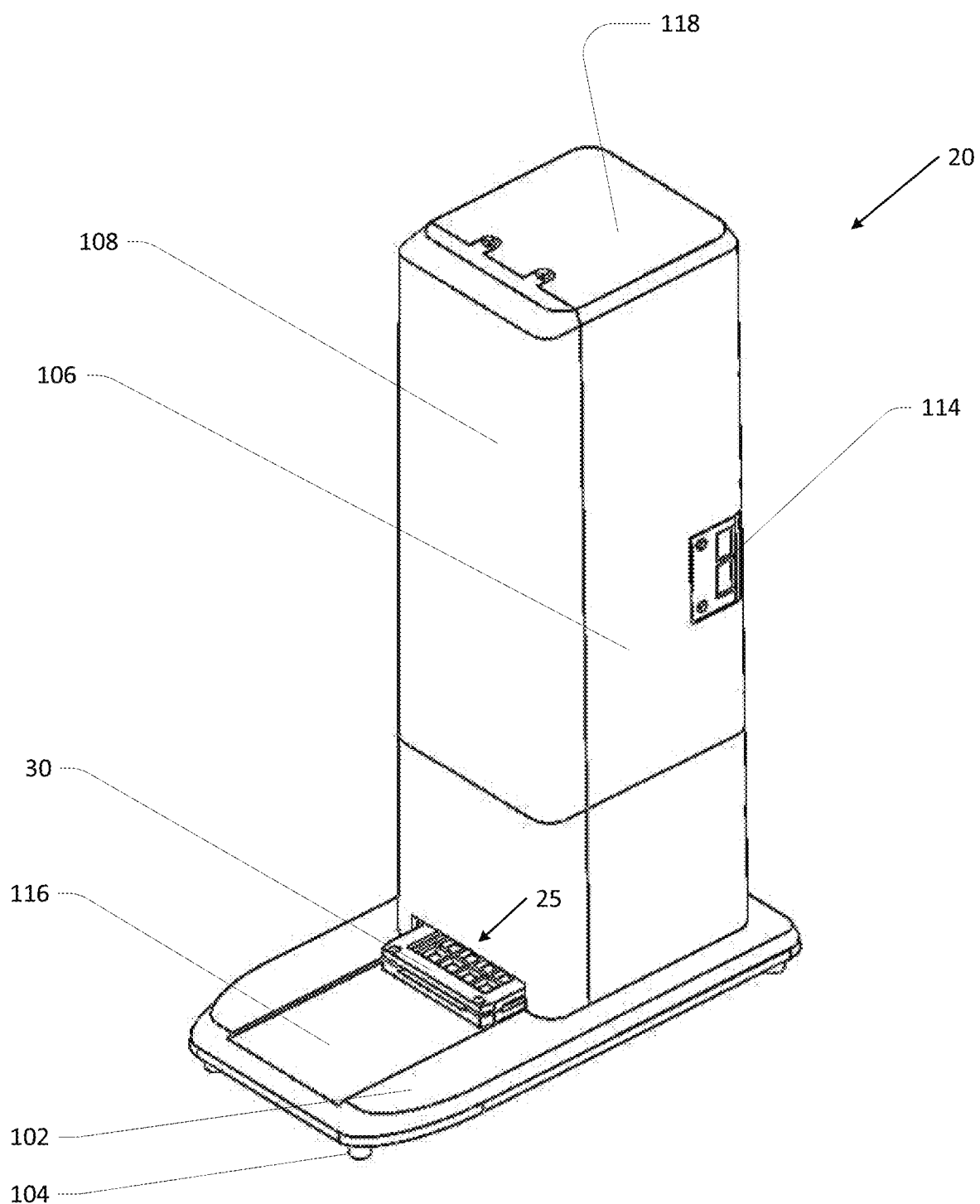
FIGS. 2E-2F show perspective views of the exterior of the exemplary apparatus for generating digital images of more than one specimen.
Figure 2F:
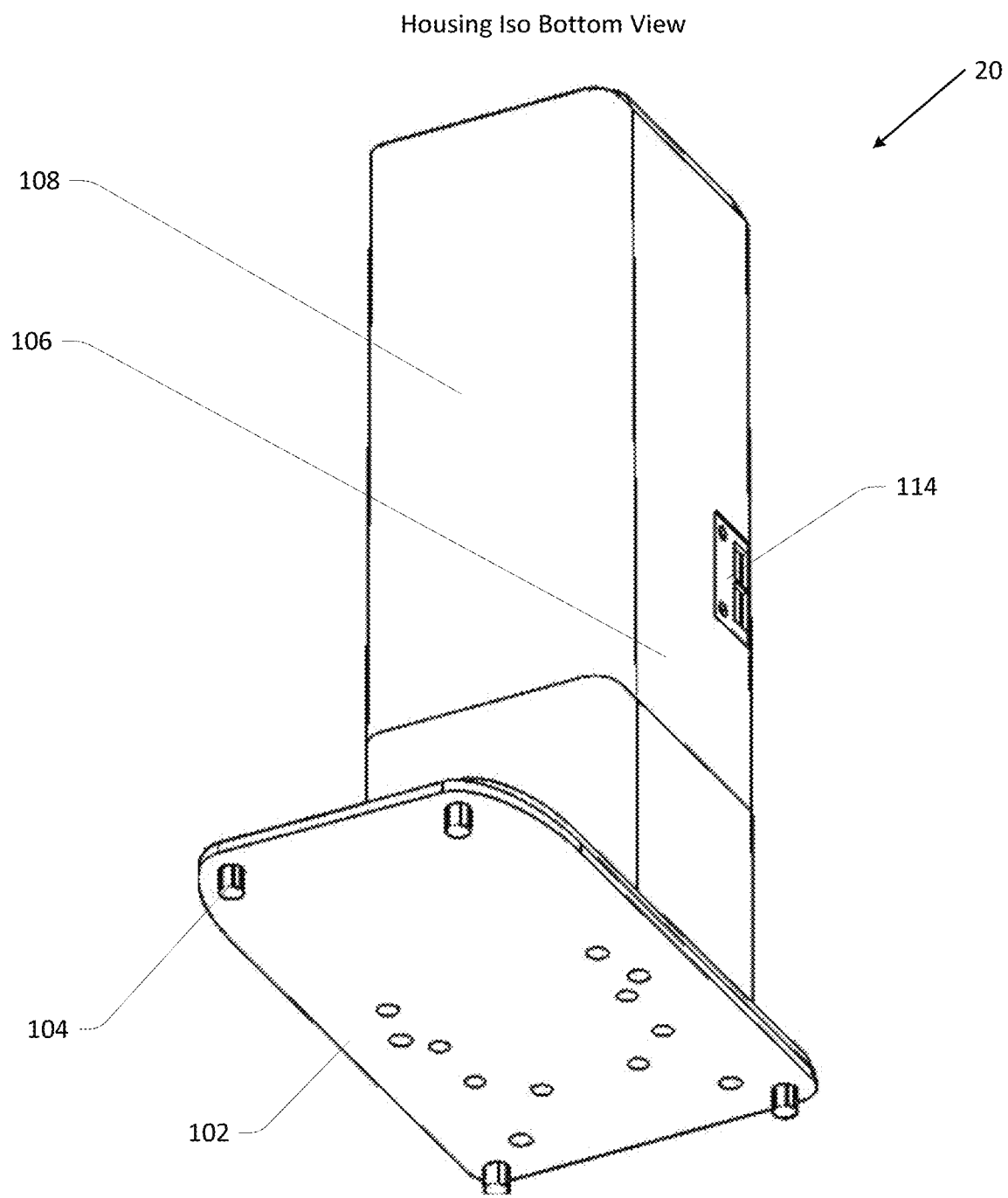

FIGS. 2E and 2F show perspective views of the exterior of the exemplary apparatus for generating digital images 20. As shown in FIG. 2E, the base 120 of the apparatus 20 includes a tray slide 116 for guiding the tray assembly 30 into the slot 25 formed in the front cover 108 of the tool's housing. FIG. 2E also shows a top access panel 118, which allows further access into the interior of the housing.

As shown in FIG. 2E, the tray assembly 25 slides into the tray slot 30 along a tray slide 116 far enough for half of the tray, i.e. up to twelve (12) specimen, to fit into the intended field of view of the imaging device. The tray assembly 25 can then be removed and remoted 180 degrees such that the other half of the tray fits within the intended field of view. In other embodiments, the field of view of the imaging device encompasses all specimens on a tray at once. In accordance with a preferred embodiment, a user can determine the species of a large amount of species, i.e. at least 200 mosquitoes per hour. The side of the housing 100 also has a side access panel 114 to allow for connections to the internet and a power source.

As shown in FIG. 2F, in accordance with a preferred embodiment, the base of the housing 102 extends out beyond the rest of the housing so as to allow the user to easily slide the tray 25 in and out of the tray slot 30. In an alternative embodiment, the tray slot 30 is duplicated on the front and rear housing, and the base of housing 102 duplicated on the rear to allow the user to easily slide the tray 25 through the tray slot 30 in a single direction. The base of the housing is slightly raised off the ground by support legs 104.

Figure 3A:
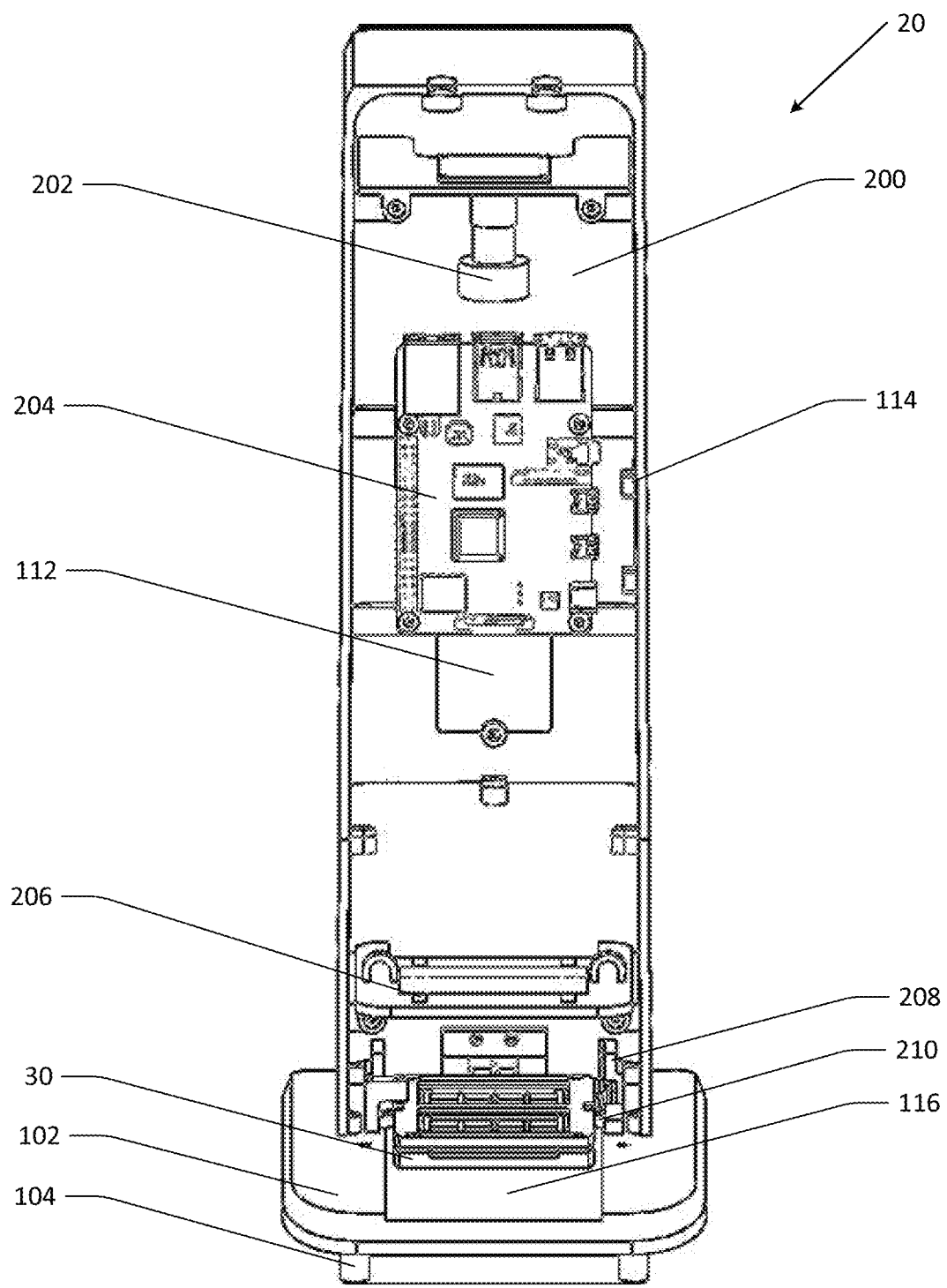
FIG. 3A is a front perspective view of interior components of the apparatus for generating digital images of more than one specimen including a imaging device and light sources arranged to generate images of sample insects.

FIGS. 3A-3E show the inner workings of the apparatus 20 in accordance with one embodiment of the present invention. FIG. 3A shows the housing 100 with the front cover 108 removed, revealing components arranged inside an inner housing cavity 200, including: a digital imaging device 202; electronics 204 including a circuit board connected to the imaging device; a mounting plate 205; top lighting components 206 affixed to the mounting plate 205; side lighting components 208 proximate the base 102; and the tray assembly 30. The housing creates an optical environment that shields external visible spectrum light from the field of view of the optical system when the specimens are loaded into the device 20. The device can further be fitted with a venting system, which may include vents and a fan.

In a preferred embodiment, the optical system 202 is designed to achieve a resolution required to clearly image the differentiating features of the specimen through the field of view, e.g., a resolution target of 28 line pairs per millimeter (lp/mm). In particular embodiments, the resolution of the optical system is at least 16 lp/mm, at least 28 lp/mm, or at least 32 lp/mm. The imaging device portion of the optical system 202 further contains a lens with effective focal length and F-stop sufficient for encompassing a clear image of the entire specimen throughout the depth of field, e.g., a minimum depth of 3 mm, regardless of orientation.

A preferred embodiment further comprises two (2) sets of lights, a top light source 206 and a side light source 208. The top light source 206 is more intense than the side light source so as to minimize shadows and create more clear images of all specimen throughout the field of view. In one embodiment, particular wavelength lighting may be used for identifying modified populations of a particular species from the wild population of that species. In another embodiment, the base underneath the tray 116 will be colored solid white so as to provide a standardized white background.

In other embodiments of the invention, there are two imaging devices, that may share an optical axis or not. In embodiments where the two imaging devices share an optical axis, the tray position and/or orientation may be manipulated for each image or the system can utilize a mirror to capture two distinct images. In embodiments where the two imaging devices do not share an optical axis, the background is manipulated behind the specimens in relation to each imaging device for each image.

Figure 3B:
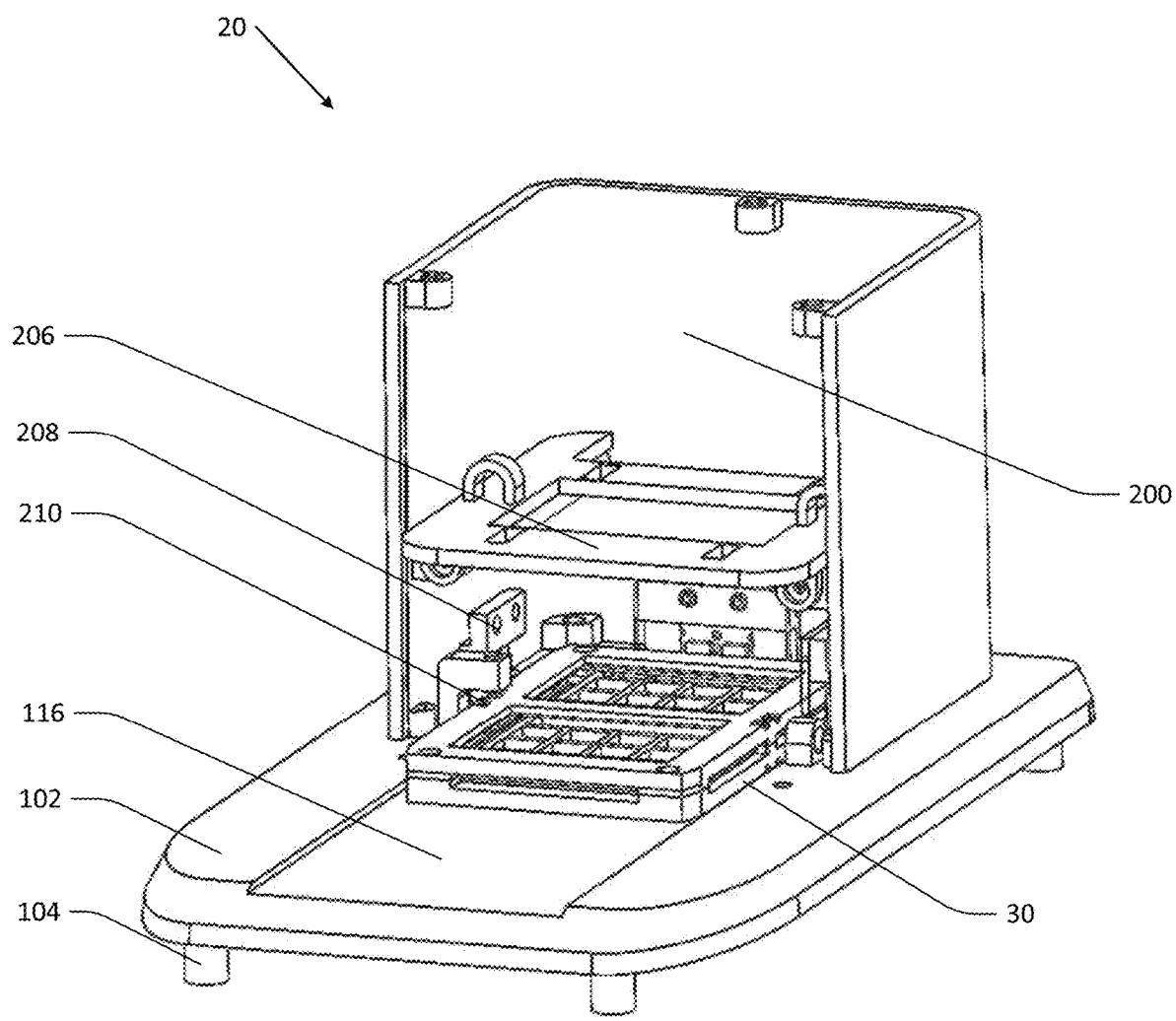
FIG. 3B is a side perspective view of interior components of a lower portion of the apparatus for generating digital images of more than one specimen including a tray slide for receiving the tray assembly and locking it into position relative the imaging device, top and side light sources in accordance with one embodiment of the invention.

FIG. 3B depicts a bottom portion of the apparatus 20 with the front panel removed to reveal the positional relationships between the tray assembly 20 and the top and side light sources. In a preferred embodiment, the side light source 208 comprises three or four (3 or 4) sets of lights, with three light sources located 90 degrees relative to each other on the left, right and back sides of the housing or with four light sources located at the corners of the tray's field of view, angled towards the center of the field of view. Each set of lights may contain one or more cool visible spectrum white LEDs with light diffusers in between the LEDs and the specimens. The top light source 206 does not contain diffusers so as to produce more clear images of all specimens in the field of view. Each light source can comprise one or more LEDs, including 1, 2 or 3 LEDs. The LEDs in certain embodiments emit visible spectrum white light.

In one embodiment of the invention, the tray insert 25 includes a mechanical system having at least one detent 210 which braces the tray to align the intended field of view of the tray with the optical field of view and provides haptic feedback to the user, i.e. through use of detents such as spring loaded ball plungers, when the tray is correctly in place. The detents will provide a small amount of resistance while still being easily removable with minimal effort. In an alternative embodiment, magnets in the housing connect to magnets on the tray to provide haptic feedback to the user when the tray is aligned in the intended field of view.

Figure 3C:
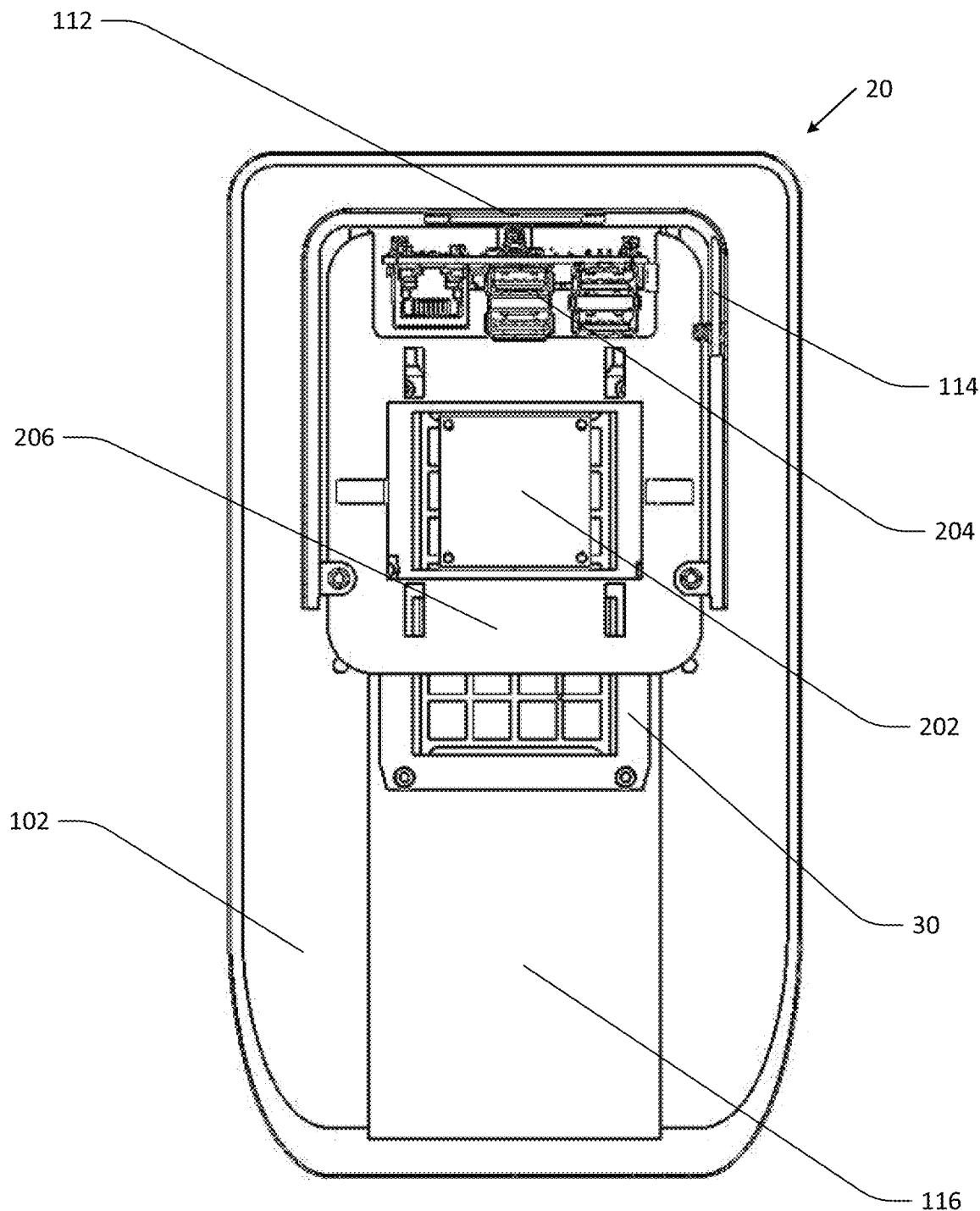
FIG. 3C is a top perspective view showing relative positioning of the imaging device, light sources and tray assembly in accordance with one embodiment.

The intended field of view, consistent with a preferred embodiment is depicted in FIG. 3C, which is a top down view from inside the housing 100. The optical system 202 is aligned directly above the intended field of view, i.e. the up to twelve (12) specimen in fully inserted tray 30.

Figure 3D:
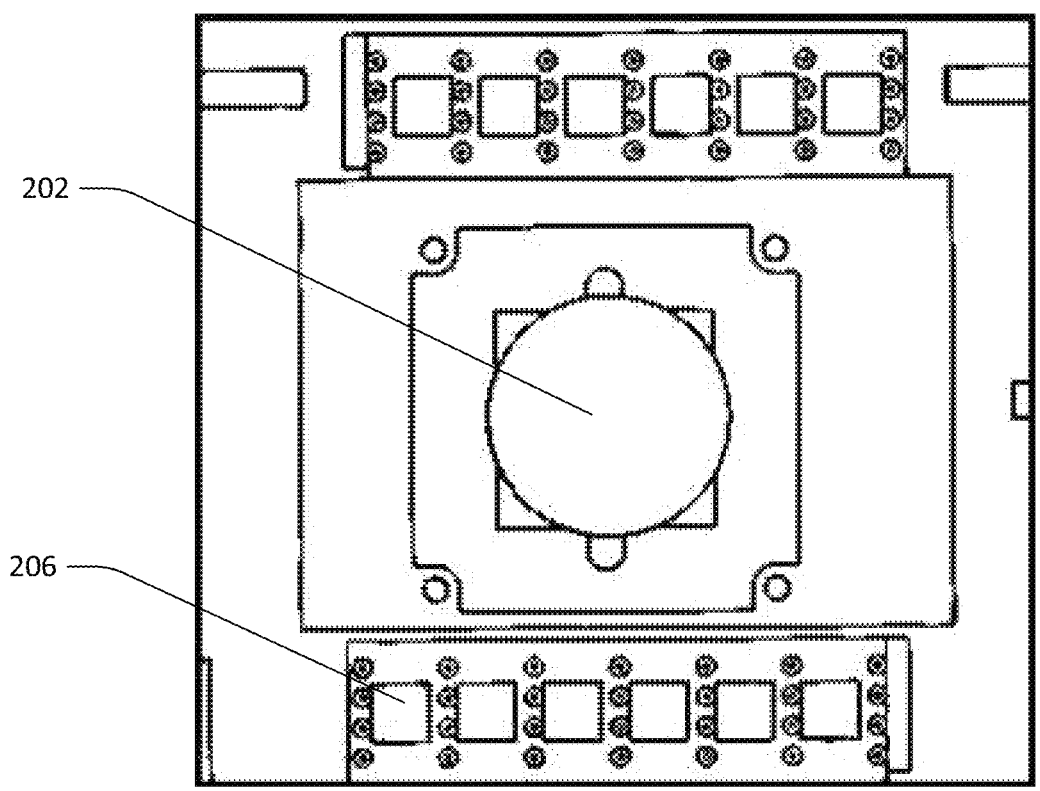
FIG. 3D is a perspective view from the tray assembly looking upwards towards the top light sources and the imaging device.

The optical system 202 and top light source 206, consistent with a preferred embodiment are depicted FIG. 3D, which is a view from the intended field of view upward. In one embodiment, the top light source 206 comprises two parallel linear arrangements of six (6) cool white LED lights are placed symmetrically along the x axis running from the left to right sides of the housing.

Figure 3E:
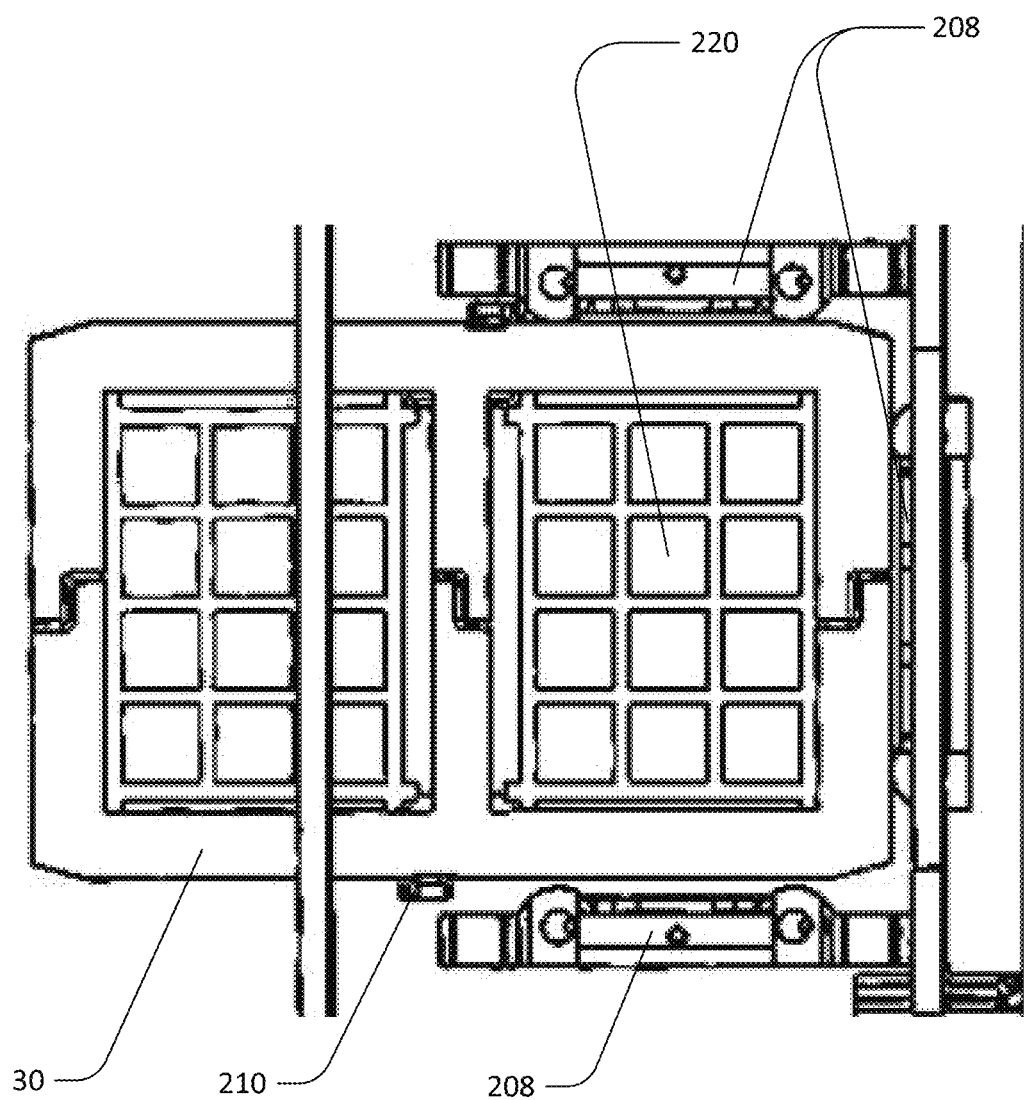
FIG. 3E is an orthogonal view looking down at the top of the tray assembly from the imaging device.

FIG. 3E depicts a top down view of the inserted tray assembly 30 locked into place by the detent mechanism 210, in accordance with a preferred embodiment. The inserted half of the tray, i.e. up to twelve (12) specimens, are aligned in the optical field of view. The side light source 208 illuminates the optical field of view from three (3) sides.

Figure 4A:
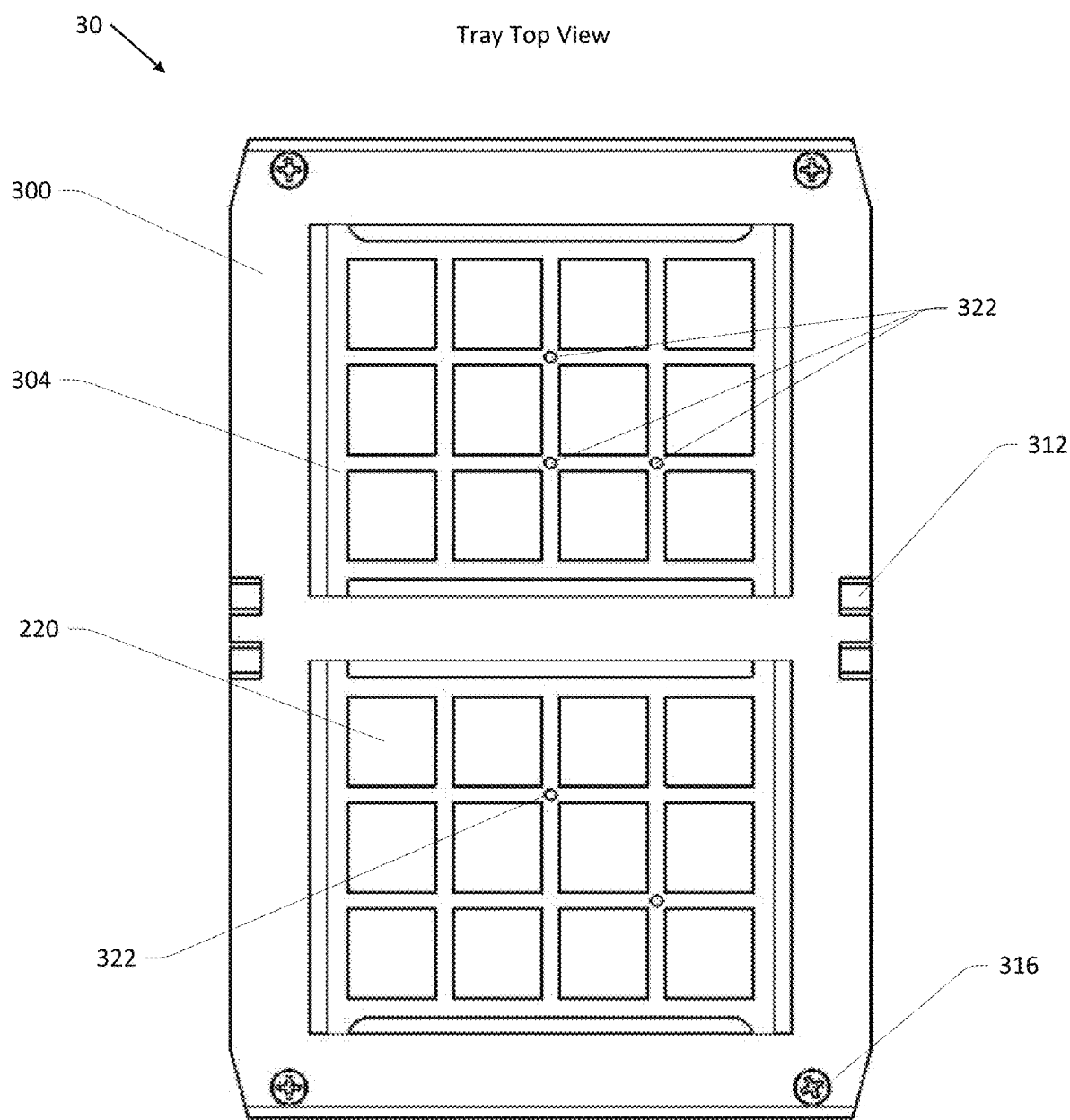
FIGS. 4A and 4B are top and bottom orthogonal views of the tray assembly.

FIGS. 4A-4F show a series of views of the tray assembly 30, in accordance with a preferred embodiment. As shown in FIG. 4A, the top of the tray well walls 304, parallel to the object plane (i.e., the first planar surface), contains markings 322 such that a mirrored view of the tray is distinguishable from the original view, indicating the orientation of the tray relative to the imaging device. These markings are in positions such that the impact on the lighting reaching the specimens is negligible while allowing extrapolation of the locations of each well based on the orientations of the markings. The system may optionally determine the orientation based on color information which discriminates the colored markers from the background. These colored markings may be colored a specific color not common in the coloring of the majority of mosquitoes commonly surveyed and/or a green color.

Each side of the tray 30 contains wells for up to 12 specimens on each side, for a total of up to 24 specimens in a single tray. The width, depth, and length of each well 320 is specifically designed to hold the specimen so that it does not rotate when the tray is flipped over. This allows the invention to create two distinct images for each specimen. Embodiments of the invention allow for the tray 30 to be flipped either automatically or manually by the user. In a preferred embodiment, the well walls 304 are sufficiently transparent to allow for uniform lighting throughout the tray. The depth of the tray 30 is designed to match the imaging device depth of field such that images of the specimen are fully visible when taken in the tray. Exemplary dimensions of each well 320 include a depth of 3 mm, width of 8 mm and length of 8 mm.

Figure 4B:
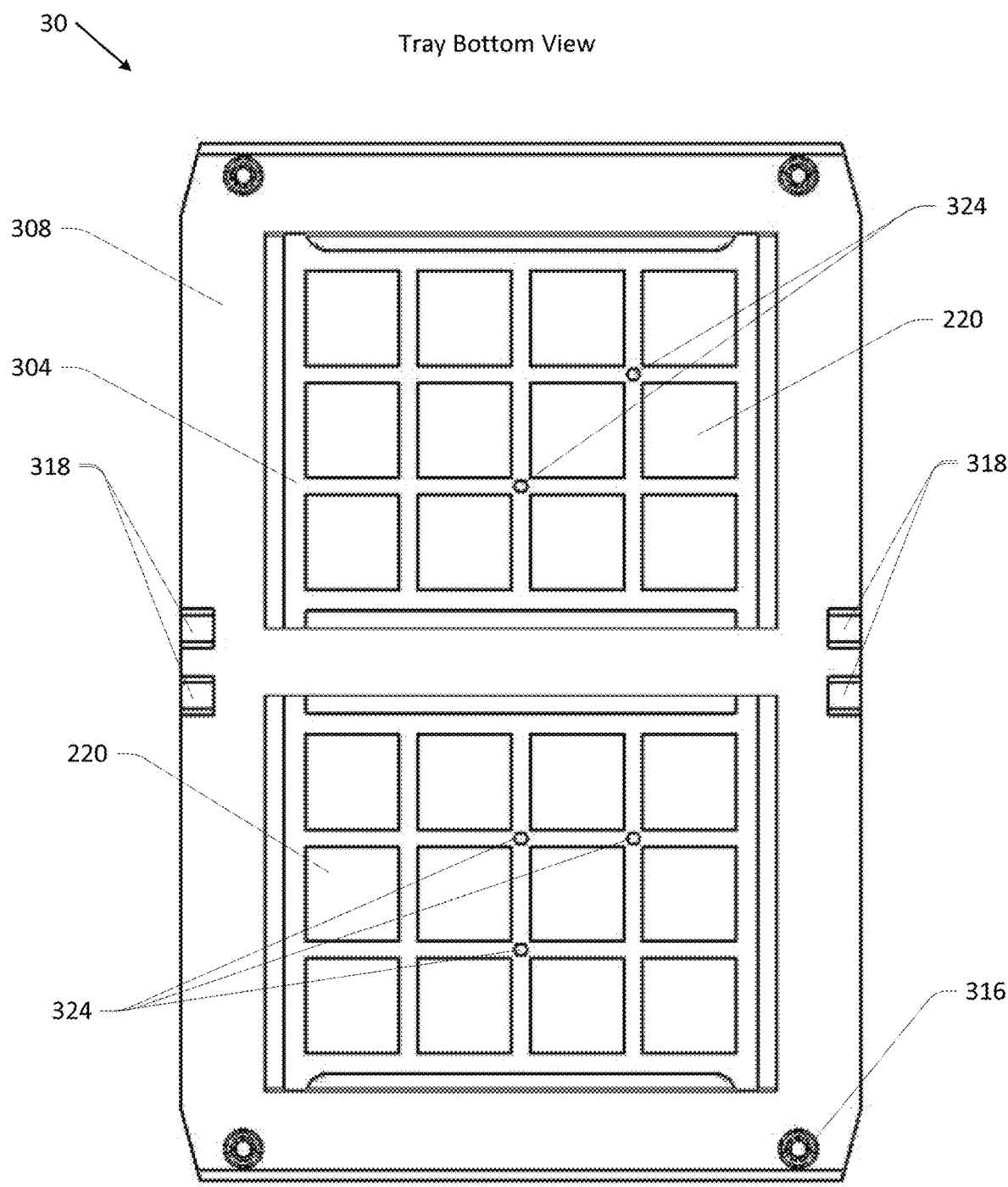
Figure 4C:
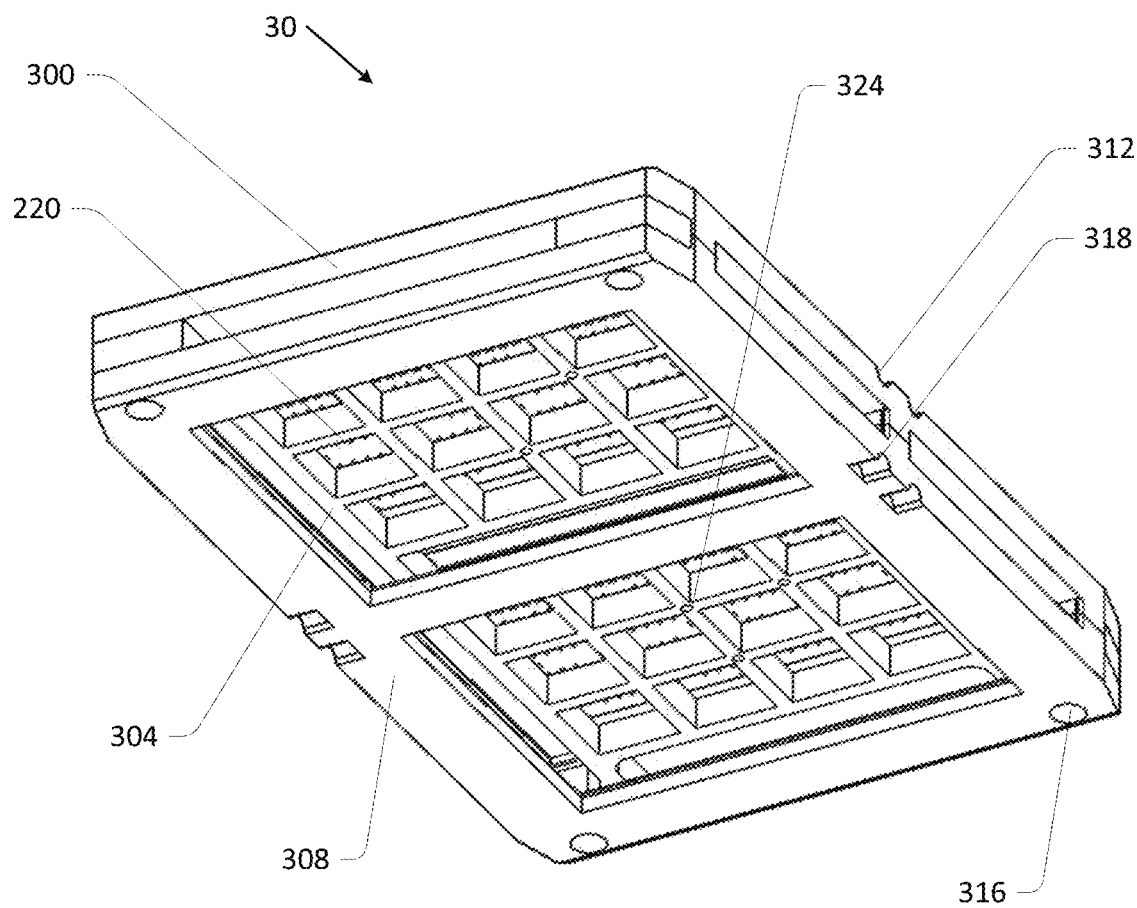
FIG. 4C is a perspective view of the tray assembly.
Figure 4D:
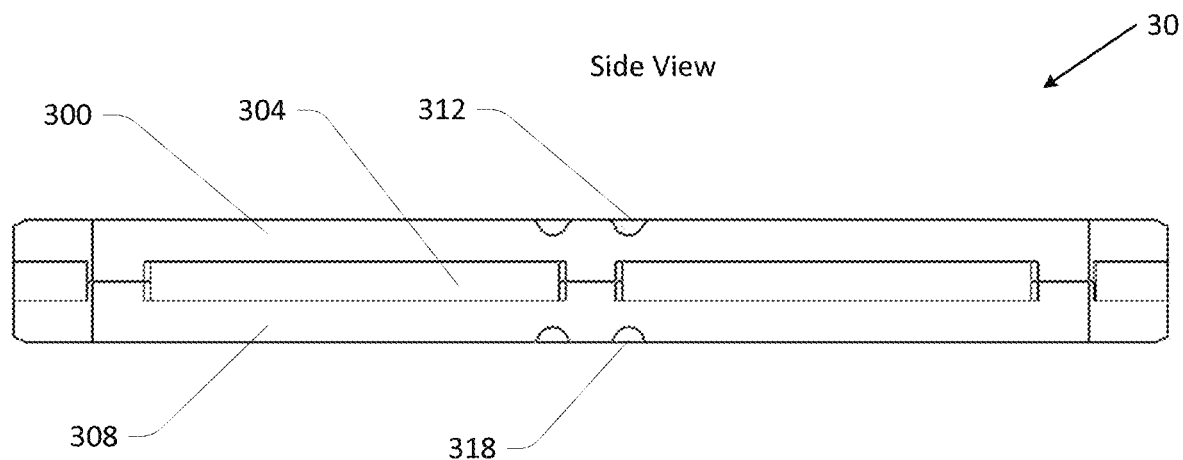
FIGS. 4D and 4E are orthogonal side and front views of the tray assembly.
Figure 4E:
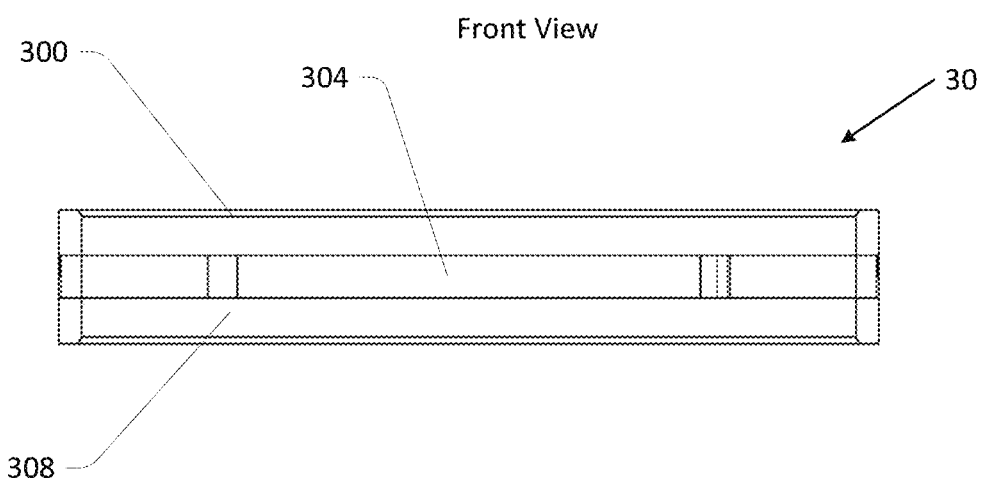

As shown in FIG. 4B, the bottom of the tray well walls (i.e., the second planar surface) 304 contains markings 324 similar to the markings on the top portion of the tray well walls 322, such that the system may consistently determine the orientation of the wells when the tray is flipped and re-inserted into the housing. These markings allow for the tray 30 to be re-inserted in any direction and the system will be able to correlate top and bottom images of each specimen.

FIGS. 4C-4F provide additional views of the assembled tray 30, in accordance with a preferred embodiment. From both the sides, FIG. 4D, and front, FIG. 4E, the transparent tray well walls 304 can be seen, allowing for the side light source 208 of the housing 100 to permeate the tray.

Figure 4F:
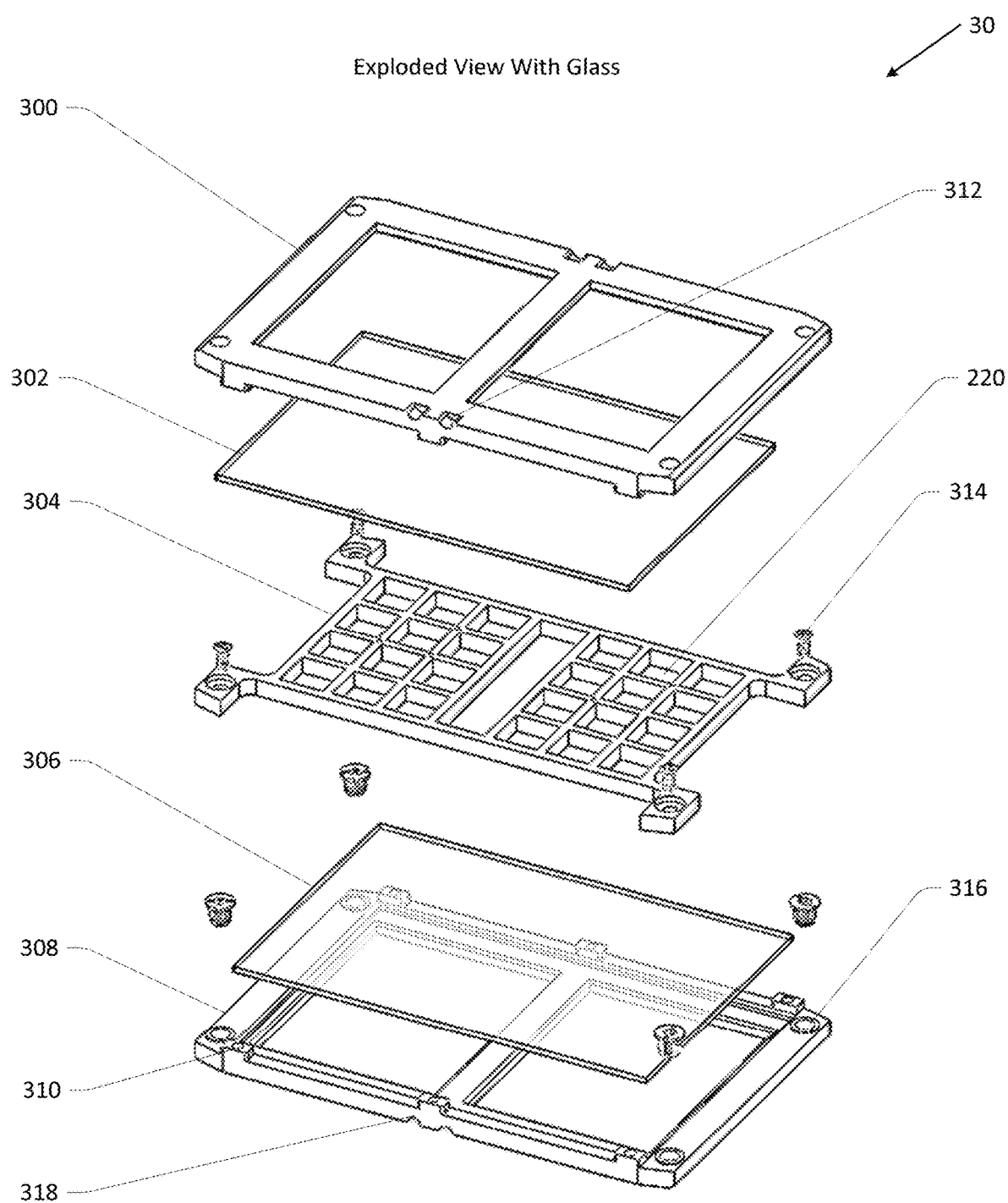
FIG. 4F is an exploded view of the tray assembly in accordance with one embodiment of the present invention.

An expanded view of the improved tray apparatus, 30 is shown in FIG. 4F. In a preferred embodiment, the well walls 304 are connected to the base of tray 308 with screws 314 that fit into threaded inserts 316 in the base of the tray 308. In another embodiment, the tray well walls are removable through use of a snap fit and release mechanism. The well walls are designed to easily come apart from the base in order to clean the components separately and reuse the tray.

In a preferred embodiment, directly on top of and beneath the well walls 304 is a transparent top coving 302 and a transparent bottom covering 306, which are scratch resistant, non-corrosive, and can be easily cleaned with liquids such as water and isopropyl alcohol or fabrics such as microfiber cloths. These transparent coverings allow the user to image both sides of the specimen. In order to prevent smudging the transparent covering and obscuring the image, a preferred embodiment also includes raised tray lid 300 and raised tray base 308 components. The raised components serve as the contact point between the tray at rest and a surface, in order to minimize the generation of static electricity on the portion of tray which comes in contact with the specimen. The raised components also serve as the area for the user to grasp without touching the portions of the tray in the intended field of view. This reduces the frequency of skin contact with the lid and base which can obscure the specimens' clarity and require more frequent cleanings, slowing the throughput of the specimens.

The preferred embodiment further includes magnetic connectors 310, which fit into the tray lid 300 and base 308, magnetically connecting the lid to the base, sealing the specimen inside. In other embodiments of the invention, the tray lid 300 and tray base 308 fit together with a snap-fit and release mechanism, a clasp mechanism, or a screw which can be turned by hand without the need for a separate tool. The lid and base further include at least one indent 312 and 318, which allow for detents on the housing 210 to fit into, thereby providing haptic feedback for the user when the tray is fully inserted in the housing 100.

Figure 4G:
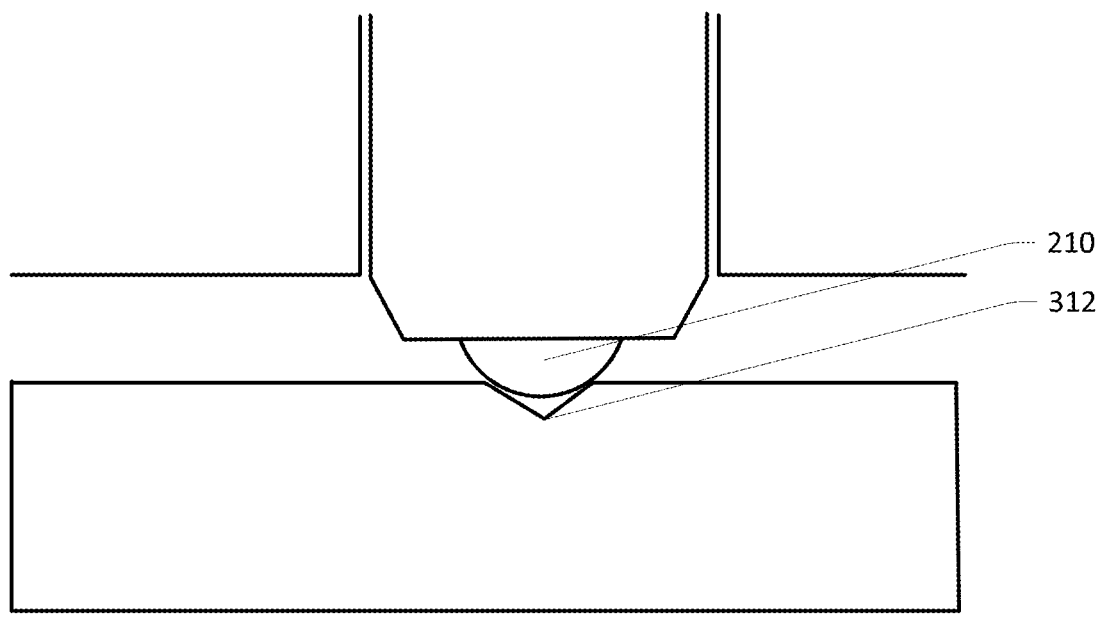
FIG. 4G is a close up side view of the locking mechanism.

FIG. 4G depicts the detent on the housing 210 fitting into the indent on the tray lid 312, thereby locking the tray in place into a fixed position when inserted into the slot. In the preferred embodiment, the detents and indents provides the user with haptic feedback when the tray is fully inserted in the housing by having the tray to "click" into place. In an alternative embodiment of the invention, magnets on the housing 210 correspond with magnets on the tray to lock the tray at defined positions.

Figure 5:
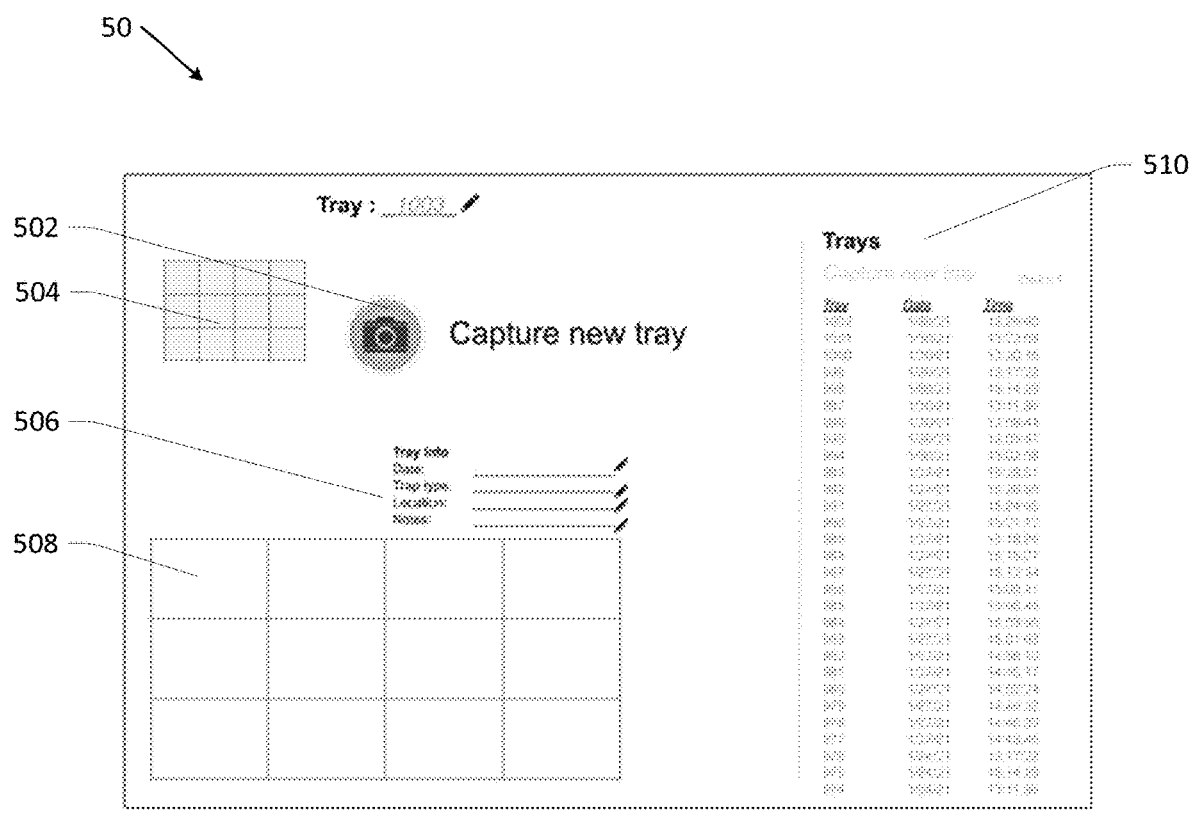
FIG. 5 is a view of the user interface of the apparatus.

FIG. 5 depicts the user interface 50, which has an image capture button 502 that allows the user to control the apparatus to take photos. The user interface 50 also displays the image 504 captured by the imaging device, and allows the user to input information about the specimens being imaged in the specimen information input box 506, such as the date, trap type, location, and user notes. The user interface 50 can display information about the specimen in the specimen identification box 508, such as the species, sex, life stage, age, physical condition, and the population origins of the specimen. The user interface 50 can also display information about previously imaged trays in the tray data history 510.

While the present invention has been described with respect to specific embodiments, modifications, variations, alterations, substitutions, and equivalents will be apparent to those skilled in the art. The present invention is not to be limited in scope by the specific embodiment described herein. Various modifications of the present invention, in addition to those described herein, will be apparent to those of skill in the art from the foregoing description and accompanying drawings. Other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

The invention claimed is:

1. An apparatus for generating digital images of more than one specimen comprising:
   an imaging device configured to capture image data;
   at least one light source for illuminating an optical field of view of the imaging device;
   a housing for enclosing the imaging device and the at least one light source, wherein the housing includes at least one opening that forms a slot configured to receive a specimen tray;
   wherein the tray includes one or more wells, each well being configured to hold at least one specimen, the tray including first and second transparent planar surfaces extending parallel to each other in a longitudinal direction from a first end of the tray to a second end of the tray and also extending in a lateral direction from a first side of the tray to a second side of the tray,
   wherein the housing and the tray further include a mechanical system having at least one mechanism for locking the tray into a fixed position aligned with the optical field of view upon insertion of the tray into the slot;
   wherein the housing, the imaging device, the optical field of the view, the at least one light source, and the tray are configured to capture image data corresponding to at least a subgroup of the wells when the tray is locked into the fixed position without having to adjust any focus or lighting parameters;
   wherein each of the first and second planar surfaces includes one or more markings indicating the orientation of the tray relative to the imaging device; and
   wherein the housing, the imaging device, the optical field of the view, the at least one light source, and the tray are configured to capture image data corresponding to at least a subgroup of the wells when the tray is locked into the fixed position without having to adjust any focus or lighting parameters.

2. The apparatus of claim 1,
   wherein the tray includes a plurality of wells separated by transparent walls, wherein each of the walls separating each of the wells extends in a transverse direction from the first planar surface to the second planar surface so that each of the wells is fully enclosed.

3. The apparatus of claim 2,
   wherein one slot, the tray, the housing and the mechanical system are configured to allow the tray to be inserted into the housing in two different fixed positions including a first fixed position in which the first planar surface faces the imaging device, and a second fixed position in which the second planar surface faces the imaging device, and
   wherein the markings on the tray visible on or through the first and second planar surfaces indicate which of the planar surfaces is facing the imaging device.

4. The apparatus of claim 2,
   wherein the apparatus is further configured to capture first image data with the tray locked in the first fixed position and second image data with the tray locked in the second fixed position, and wherein the markings on the tray visible on or through the first and second planar surfaces allow for correlating the first and second image data relative to each of the wells in the tray.

5. The apparatus of claim 2,
   wherein the tray includes a first group of wells proximate the first end of the tray, and a second of wells proximate the second end of the tray; and
   the slot, the tray, the housing and the mechanical system are configured to allow the tray to be inserted into the housing in four different fixed positions including,
   a first fixed position in which the first planar surface faces the imaging device, and the first group of wells is positioned within the field of view of the imaging device,
   a second fixed position in which the first planar surface faces the imaging device, and the second group of wells is positioned within the field of view of the imaging device,
   a third fixed position in which the second planar surface faces the imaging device, and the first group of wells is positioned within the field of view of the imaging device, and a fourth fixed position in which the second planar surface faces the imaging device, and the second group of wells is positioned within the field of view of the imaging device; and wherein the markings on the tray visible on or through the first and second planar surfaces indicate which one of the first and second planar surfaces is facing the imaging device, and which one of the first and second groups of wells is positioned within the field of view of the imaging device.

6. The apparatus of claim 5, wherein the apparatus is further configured to capture first, second, third and fourth image data with the tray locked in the first, second, third and fourth fixed positions, and wherein the markings on the tray visible on or through the first and second planar surfaces allow for correlating the first, second, third and fourth image data relative to each of the wells in the tray.

7. The apparatus of claim 5, wherein each of the first and the second groups of wells includes twelve wells.

8. The apparatus of claim 1, wherein the at least one light source further comprises an exciting lighting source for causing each specimen to emit light in a specific wavelength band, wherein the emissions of light within specific wavelength bands allow for classifying the specimen.

9. The apparatus of claim 1, wherein the at least one light source further comprises:

a top light source configured to illuminate the optical field of view of the imaging device; and a side light source configured to illuminate the optical field of view of the imaging device;

wherein the top light source is more intense than the side light source.

10. The apparatus of claim 9, wherein the top light source comprises two parallel linear arrangements of LEDs.

11. The apparatus of claim 9, wherein the side light source comprises three side lighting sources surrounding the tray on three sides, excluding the side where the tray must be inserted, wherein each side lighting source is rotated 90 degrees relative to each adjacent side lighting source, and each side lighting source contains LEDs with light diffusers in between the LEDs and the specimens.

12. The apparatus of claim 1, wherein the specimen tray further comprises a raised tray lid and raised tray base outside of the transparent top and bottom coverings such that the tray is capable of being manipulated without touching the transparent top and bottom coverings.

13. The apparatus of claim 12, wherein the raised tray lid, the raised tray base, the transparent first and second planar surfaces, and tray well walls are held together by a plurality of screws, a plurality of magnets, or a combination thereof.

14. The apparatus of claim 2, wherein each of the wells is configured to hold a specimen in the same relative orientation to the specimen tray when the specimen tray is flipped upside down.

15. The apparatus of claim 14, wherein the depth of each well constitutes the depth of field of the imaging device.

16. The apparatus of claim 1, further comprising: a circuit board coupled to the imaging device and to at least one light source.

17. The apparatus of claim 16, wherein the circuit board includes a processor adapted to process the image data, to analyze the marking in order to determine the orientation of the tray relative to the imaging device, and to send signals to the indicator panel to cause the panel to indicate when image data has been captured for a corresponding orientation of the tray relative to the imaging device.

18. The apparatus of claim 17, wherein the circuit board includes a processor adapted to process the image data to identify one or more characteristics of the specimen.

19. The apparatus of claim 1, wherein the tray contains a plurality of target optical fields of view, along the same axis that the tray is inserted into the device along, which can be imaged in succession by sliding the tray further into and through the device.

20. The apparatus of claim 1, wherein the specimen is an invertebrate.

21. The apparatus of claim 20, wherein the specimen is an arthropod.

22. The apparatus of claim 21, wherein the specimen is a mosquito.

23. The apparatus of claim 21 wherein the specimen is a tick.

24. A system for identifying the species of an arthropod, comprising:

an apparatus for generating digital images of more than one specimen comprising: an imaging device configured to capture image data;

at least one light source for illuminating an optical field of view of the imaging device;

a housing for enclosing the imaging device and the at least one light source, wherein the housing includes an opening that forms a slot configured to receive a specimen tray;

wherein the tray includes one or more wells, each wells being configured to hold at least one specimen, the tray including first and second transparent planar surfaces extending parallel to each other in a longitudinal direction from a first end of the tray to a second end of the tray and also extending in a lateral direction from a first side of the tray to a second side of the tray, wherein the housing and the tray further include a mechanical system having at least one detent and at least one indent for locking the tray into a fixed position aligned with the optical field of view upon insertion of the tray into the slot; and wherein the housing, the imaging device, the optical field of the view, the at least one light source, and the tray are configured to capture image data corresponding to at least a subgroup of the wells when the tray is locked into the fixed position without having to adjust any focus or lighting parameters;

wherein the tray includes a plurality of wells separated by transparent walls, wherein each of the walls separating each of the wells extends in a transverse direction from the first planar surface to the second planar surface so that each of the wells is fully enclosed;

wherein each of the first and second planar surfaces includes one or more markings indicating the orientation of the tray relative to the imaging device; and wherein the housing, the imaging device, the optical field of the view, the at least one light source, and the tray are configured to capture image data corresponding to at least a subgroup of the wells when the tray is locked into the fixed position without having to adjust any focus or lighting parameters; and a server connected to said apparatus via the Internet, the server including a processor and memory for analyzing the image data to identify at least one of the species, sex, life stage, age, physical condition, and the population origins of the specimen.

\* \* \* \* \*